United States Patent
Yoon et al.

(10) Patent No.: US 10,593,916 B2
(45) Date of Patent: Mar. 17, 2020

(54) ENERGY STORAGE SYSTEM

(71) Applicant: LG Chem, Ltd., Seoul (KR)

(72) Inventors: Sung-Han Yoon, Daejeon (KR);
Tae-Shin Cho, Daejeon (KR);
Hyun-Min Lee, Daejeon (KR); Ji-Won Lee, Daejeon (KR); Young-Bo Cho, Daejeon (KR)

(73) Assignee: LG Chem, Ltd. (KR)

( * ) Notice: Subject to any disclaimer, the term of this patent is extended or adjusted under 35 U.S.C. 154(b) by 137 days.

(21) Appl. No.: 15/797,331

(22) Filed: Oct. 30, 2017

(65) Prior Publication Data
US 2018/0123094 A1    May 3, 2018

(30) Foreign Application Priority Data
Oct. 31, 2016    (KR) .................. 10-2016-0143646

(51) Int. Cl.
*H01M 2/10*    (2006.01)
*B65D 51/16*    (2006.01)

(52) U.S. Cl.
CPC .......... *H01M 2/1072* (2013.01); *B65D 51/16* (2013.01); *H01M 2/1077* (2013.01); *H01M 2220/10* (2013.01); *H01M 2220/30* (2013.01)

(58) Field of Classification Search
CPC ............ H01M 2/1072; H01M 2/1077; H01M 2220/10; H01M 2220/30; B65D 51/16
See application file for complete search history.

(56) References Cited

U.S. PATENT DOCUMENTS

| | | | |
|---|---|---|---|
| 7,667,430 B2 | 2/2010 | Kitanaka | |
| 8,859,127 B2 | 10/2014 | Han et al. | |
| 9,461,344 B2 | 10/2016 | Lee et al. | |
| 2007/0181576 A1* | 8/2007 | Frazier | H01M 2/1016 220/62.22 |
| 2015/0061571 A1* | 3/2015 | Lin | H02J 7/0044 320/107 |
| 2016/0056510 A1* | 2/2016 | Takeuchi | H01M 10/482 429/7 |
| 2017/0309979 A1* | 10/2017 | Lee | H01M 10/6563 |

FOREIGN PATENT DOCUMENTS

| | | |
|---|---|---|
| KR | 10-2008-0014875 A | 2/2008 |
| KR | 20110011771 A | 2/2011 |
| KR | 10-2012-0120663 A | 11/2012 |
| KR | 10-2013-0009136 A | 1/2013 |
| KR | 20150102637 A | 9/2015 |

* cited by examiner

*Primary Examiner* — Stewart A Fraser
(74) *Attorney, Agent, or Firm* — Lerner, David, Littenberg, Krumholz & Mentlik, LLP (57) ABSTRACT

Disclosed is an energy storage system, which includes at least one battery rack including at least one battery pack, a rack housing having an accommodation space for accommodating the at least one battery rack, and a rack door unit mounted to the rack housing to open or close the accommodation space of the rack housing and at least partially made of flexible material.

16 Claims, 7 Drawing Sheets

ENERGY STORAGE SYSTEM

TECHNICAL FIELD

The present application claims priority to Korean Patent Application No. 10-2016-0143646 filed on Oct. 31, 2016 in the Republic of Korea, the disclosures of which are incorporated herein by reference.

The present disclosure relates to an energy storage system.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Here, the battery module includes a module case in which battery cells and various electrical parts are packaged, and a module connector connected to an external connector for electrical connection with an external device outside the module case. The external connector may be, for example, a connector for electrically connecting a plurality of battery modules. Here, the battery pack including at least one battery module is used for household purposes or industrial purposes depending on various voltage and capacity requirements, and battery racks respectively including at least one battery pack may be combined to configure an energy storage system.

A conventional energy storage system includes at least one battery rack having at least one battery pack, at least one rack housing having an accommodation space for accommodating at least one battery rack, and a rack door mounted to at least one rack housing to open or close the accommodation space of at least one rack housing. Here, the rack door is generally made of steel material and mounted to the rack housing.

However, due to the weight of the rack door made of steel material, the entire weight of the conventional energy storage system is increased, which may cause a problem in reducing the product weight in the recent slimming trend.

In addition, in the conventional energy storage system, the rack door is shaped to have a mesh structure or the like for the circulation of inside air, but the cost for this shaping process is inevitably increased due to the steel material.

Therefore, there is a need to find a method of providing an energy storage system capable of reducing the manufacturing cost while decreasing the weight of the product.

DISCLOSURE

Technical Problem

The present disclosure is directed to providing an energy storage system, which may reduce manufacture costs while decreasing the weight of the product.

Technical Solution

In one aspect of the present disclosure, there is provided an energy storage system, comprising: at least one battery rack including at least one battery pack; a rack housing having an accommodation space for accommodating the at least one battery rack; and a rack door unit mounted to the rack housing to open or close the accommodation space of the rack housing and at least partially made of flexible material.

The rack door unit may include: a rack door body mounted to the rack housing; a door cover connected to the rack door body and configured to cover a front portion of the accommodation space; and a cover locking unit mounted to the door cover and configured to separate or fix the door cover from/to the rack housing so that the accommodation space is opened or closed, wherein the door cover is made of the flexible material.

The door cover may be at least partially rolled toward the rack door body when being separated from the rack housing.

The rack door body may include: a cover rolling portion configured to wind or unwind the door cover; and an elastic operating portion connected to the cover rolling portion and configured to guide winding or unwinding of the door cover.

The cover locking unit may include: a locking body mounted to a bottom portion of the door cover; and a locking lever provided at the locking body and detachably mounted to the rack housing.

A level insert groove may be provided at the rack housing so that the locking lever is inserted thereto.

The door cover may be made of polyvinyl material.

The at least one battery pack may include at least one battery cell, and the at least one battery cell may be a secondary battery.

Advantageous Effects

According to various embodiments as above, it is possible to provide an energy storage system, which may reduce manufacture costs while decreasing the weight of the product.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
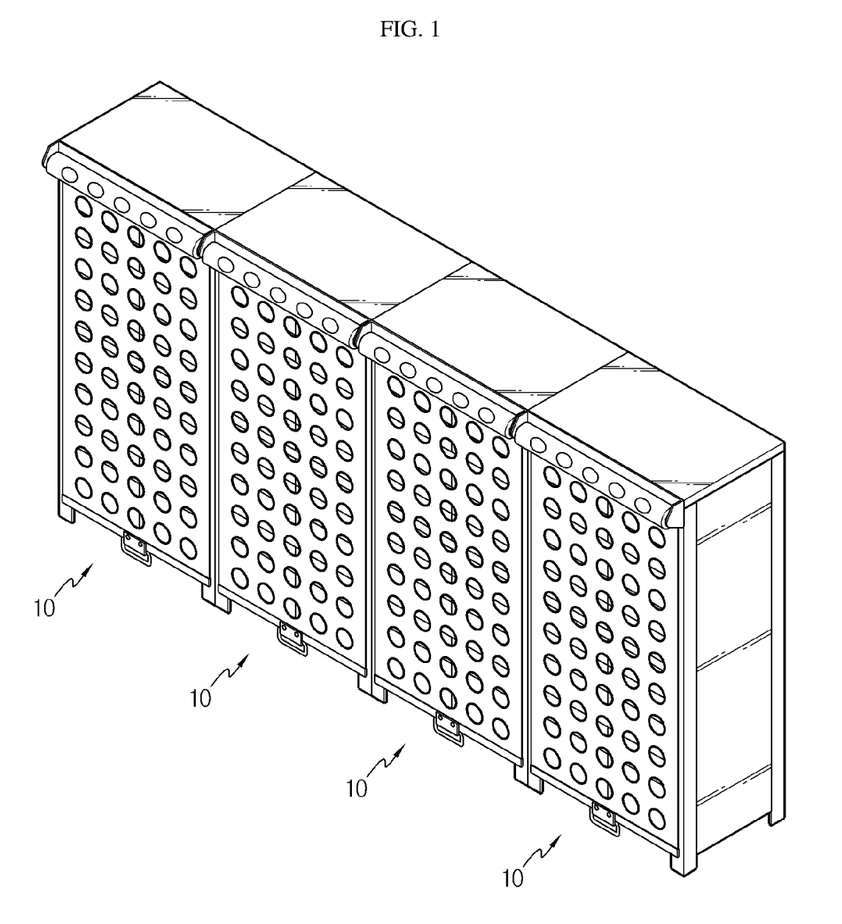
FIG. 1 is a diagram for illustrating an energy storage system according to an embodiment of the present disclosure.
Figure 2:
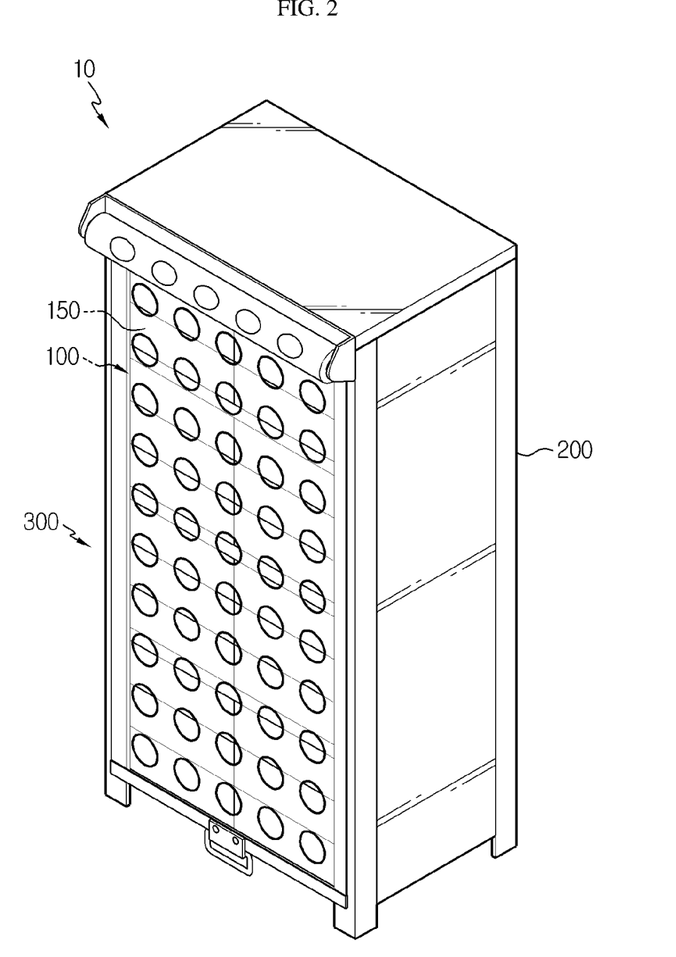
FIG. 2 is a diagram for illustrating essential parts of the energy storage system of FIG. 1.
Figure 3:
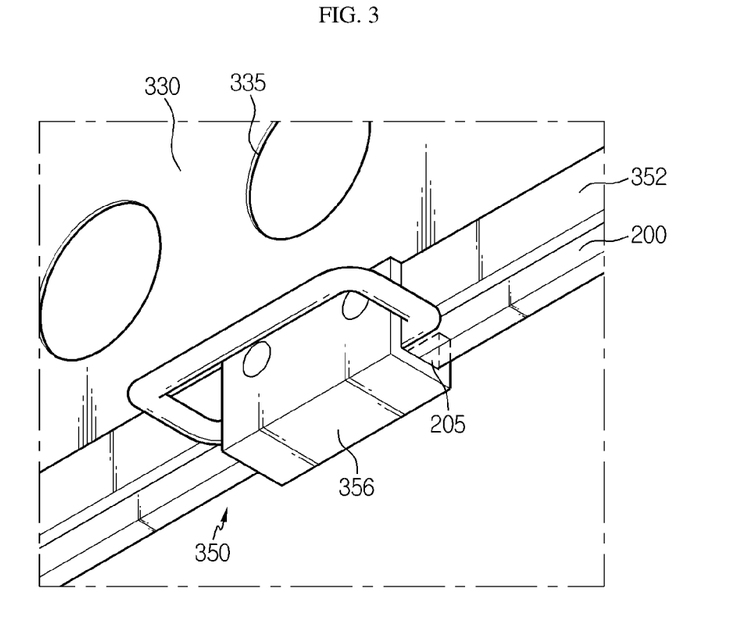
FIGS. 3 and 4 are diagrams for illustrating that a rack door unit of the energy storage system of FIG. 2 is opened and closed.
Figure 4:
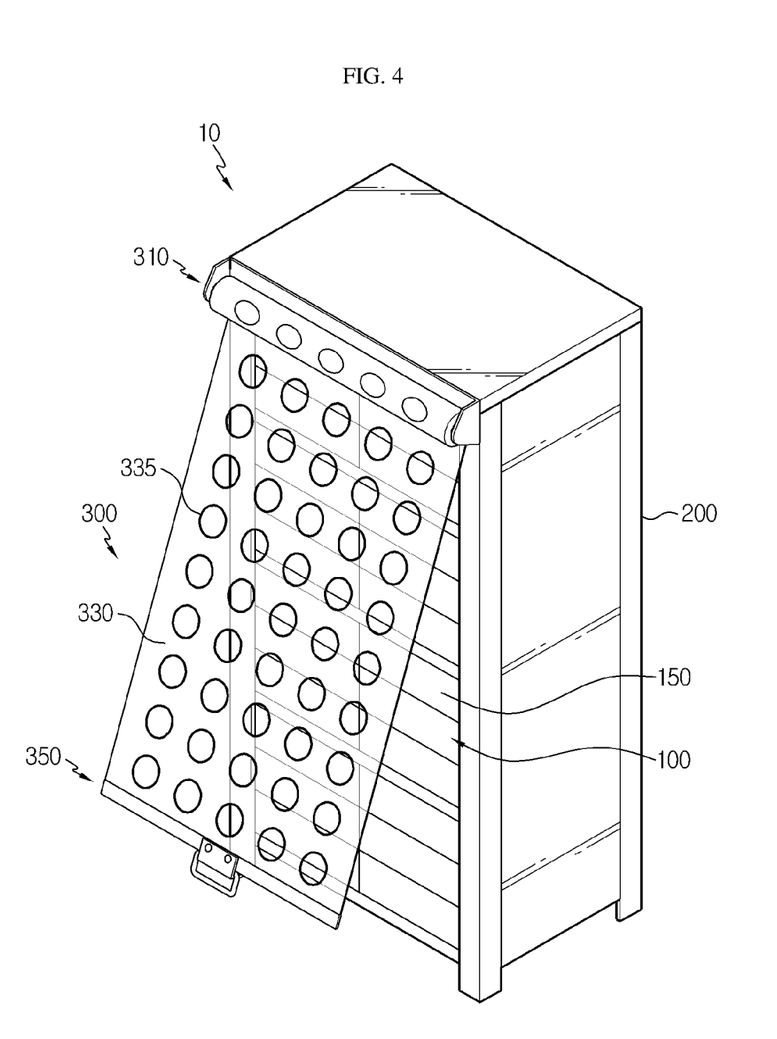
Figure 5:
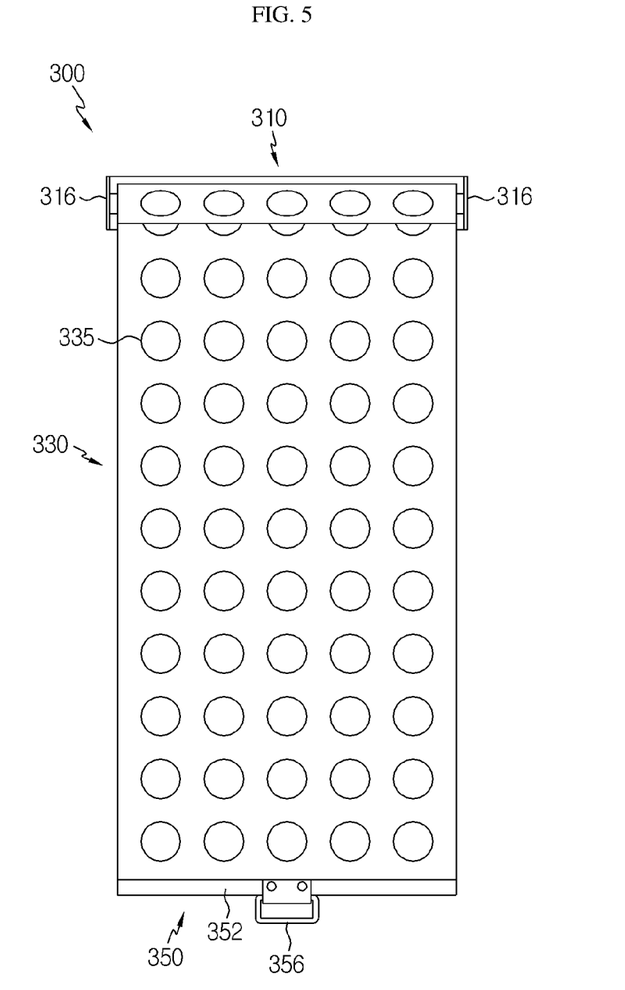
FIGS. 5 to 8 are diagrams for illustrating a rolling operation of a door cover of the rack door unit of the energy storage system of FIG. 2.
Figure 6:
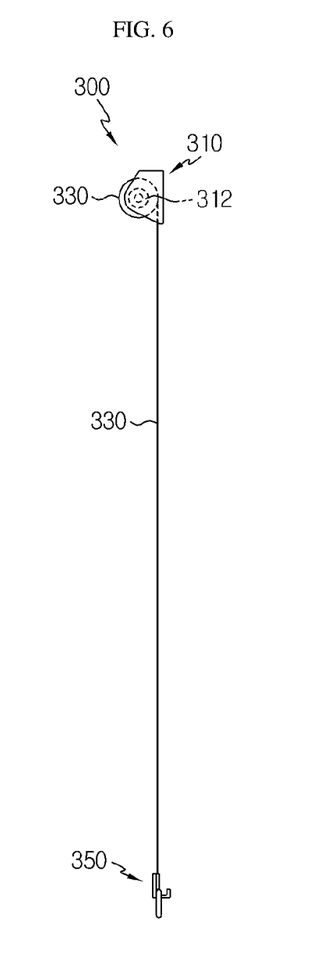
Figure 7:
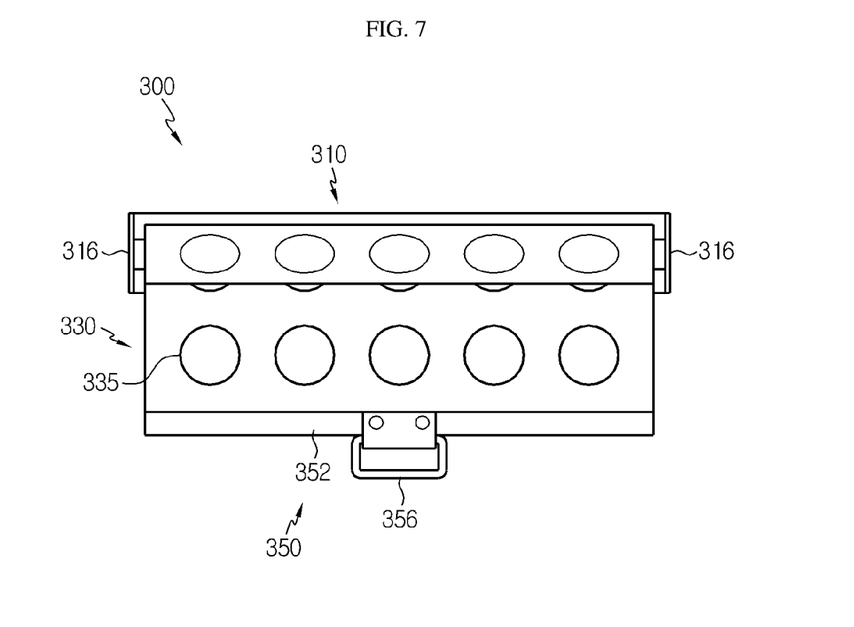
Figure 8:
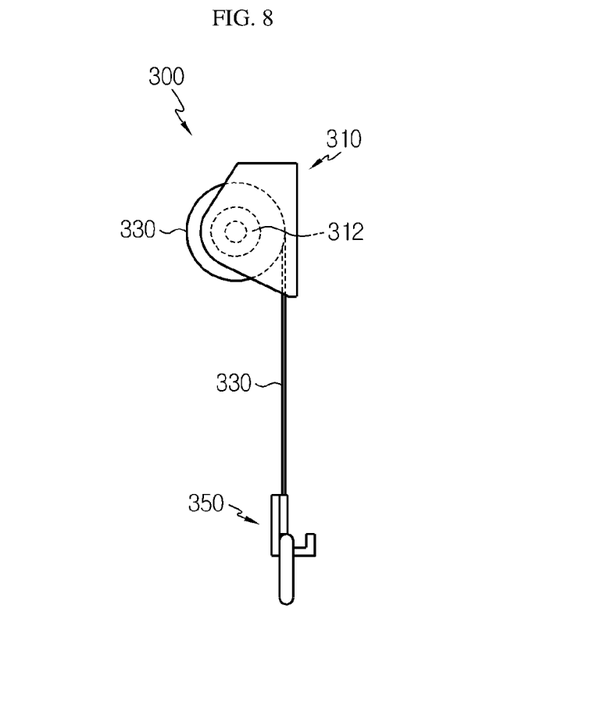

FIG. 1 is a diagram for illustrating an energy storage system according to an embodiment of the present disclosure, FIG. 2 is a diagram for illustrating essential parts of the energy storage system of FIG. 1, FIGS. 3 and 4 are diagrams for illustrating that a rack door unit of the energy storage system of FIG. 2 is opened and closed, and FIGS. 5 to 8 are diagrams for illustrating a rolling operation of a door cover of the rack door unit of the energy storage system of FIG. 2.

Referring to FIGS. 1 to 8, an energy storage system 10 is used for guiding stably supply of energy and may be a device for storing power excessively generated at a power plant or the like or transmitting the power at a power peak.

The energy storage system 10/ may use a physical energy or a chemical energy as an energy source. Hereinafter, this embodiment will be explained based on the case that the energy storage system uses a secondary battery as a chemical energy source.

The energy storage system 10 may be provided in plural and disposed in a structure such as container, and each energy storage system may include a battery rack 100, a rack housing 200 and a rack door unit 300.

The battery rack 100 may be provided by stacking a plurality of battery packs 150. The plurality of battery packs 150 respectively include at least one battery cell, and at least one battery cell may be a secondary battery.

The battery rack 100 may be provided in plural, and the plurality of battery racks 100 may be stacked with each other and mounted to an accommodation space of the rack housing 200, explained later.

The rack housing 200 has an accommodation space for accommodating the plurality of battery racks 100 and may form an appearance of the energy storage system 10.

The rack housing 200 may have a level insert groove 205. The level insert groove 205 is provided at a bottom portion of the rack housing 200, a locking lever 356 of a cover locking unit 350, explained later, may be inserted thereto.

The rack door unit 300 may be mounted to the rack housing 200 to open or close the accommodation space of the rack housing 200. The rack door unit 300 may be at least partially made of flexible material. The flexible material is a lightweight material such as polyvinyl.

The rack door unit 300 may include a rack door body 310, a door cover 330 and a cover locking unit 350.

The rack door body 310 may be mounted to an upper portion of the rack housing 200. The rack door body 310 may include a cover rolling portion 312 and an elastic operating portion 316.

The cover rolling portion 312 may wind or unwind the door cover 330, explained later. For this, the cover rolling portion 312 may have a rolling shaft structure to roll the door cover 330.

The elastic operating portion 316 is connected to the cover rolling portion 312 and may give an elastic driving force for guiding winding or unwinding of the door cover 330, explained later. For this, the elastic operating portion 316 may have an elastic spring structure. Without being limited thereto, the elastic operating portion 316 may have any other structures capable of giving an elastic driving force in various ways. In addition, the elastic operating portion may also have other structures capable of giving a driving force, instead of an elastic driving force.

The door cover 330 covers a front portion of the accommodation space of the rack housing 200 and may be made of the flexible material. For example, the door cover 330 may be made of a lightweight material such as polyvinyl.

Accordingly, in this embodiment, since the door cover 330 is made of a lightweight material such as polyvinyl, the entire weight of the rack door unit 300 may be reduced, and this it is possible to provide a more lightweight rack door unit 300.

The door cover 330 may be at least partially rolled toward the rack door body 310 when being separated from the rack housing 200, and may also be spread when being mounted to the rack housing 200. In other words, the door cover 330 may be spread in a rolling manner to cover the front portion of the accommodation space when being mounted to the rack housing 200, and may be rolled toward the rack door body 310 to open the accommodation space when being separated from the rack housing 200.

The rolling operation of the door cover 330 may be automatically performed by means of the rack door body 310 when being separated from the rack housing 200 of the door cover 330. Accordingly, a worker may open the door cover 330 more conveniently when opening the accommodation space of the rack housing 200.

Meanwhile, an air circulation hole 335 may be formed in the door cover 330.

The air circulation hole 335 may be provided in plural, and the plurality of air circulation holes 335 may allow air to move into the accommodation space of the rack housing 200 for air circulation even though the door cover 330 is closed.

In this embodiment, since the door cover 330 is made of material such as polyvinyl, the air circulation hole 335 may be formed more conveniently. In other words, the air circulation hole 335 may be formed more conveniently with low costs, compared with the case where an air circulation hole is formed in a steel material into a mesh structure. Thus, in this embodiment, the manufacture cost for forming the air circulation hole 335 may be greatly lowered.

The cover locking unit 350 is mounted to the door cover 330 and may separate the door cover 330 from the rack housing 200 or fix the door cover 330 to the rack housing 200 so that the accommodation space of the rack housing 200 is opened or closed.

The cover locking unit 350 may include a locking body 352 and a locking lever 356.

The locking body 352 may be mounted to a bottom portion of the door cover 330. The locking lever 356 is provided at the locking body 352 and may be detachably mounted to the rack housing 200. In detail, the locking lever 356 may be inserted into and fixed to the level insert groove 205 when being mounted to the rack housing 200 and may be released from the level insert groove 205 when being separated from the rack housing 200.

As described above, the energy storage system 10 of this embodiment may reduce a product weight and decrease the manufacture cost by means of the rack door unit 300.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

| Reference Signs | |
|---|---|
| 10: energy storage system | 100: battery rack |
| 150: battery pack | 200: rack housing |
| 205: level insert groove | 300: rack door unit |
| 310: rack door body | 312: cover rolling portion |
| 316: elastic operating portion | 330: door cover |
| 335: air circulation hole | 350: cover locking unit |
| 352: locking body | 356: locking lever |

What is claimed is:

1. An energy storage system, comprising:
   at least one battery rack including at least one battery pack;
   a rack housing having an accommodation space for accommodating the at least one battery rack; and
   a rack door unit mounted to the rack housing to open or close the accommodation space of the rack housing and at least partially made of flexible material,
   wherein the rack door unit comprises a rollable material,
   wherein the accommodation space of the rack housing is open when the rollable material is rolled, and
   wherein the accommodation space of the rack housing is closed when the rollable material is unrolled.

2. The energy storage system according to claim 1, wherein the rack door unit includes:
   a rack door body mounted to the rack housing;
   a door cover connected to the rack door body and configured to cover a front portion of the accommodation space; and
   a cover locking unit mounted to the door cover and configured to separate or fix the door cover from/to the rack housing so that the accommodation space is opened or closed,
   wherein the door cover is made of the flexible material.

3. The energy storage system according to claim 2,
   wherein the door cover is at least partially rolled toward the rack door body when being separated from the rack housing.

4. The energy storage system according to claim 3, wherein the rack door body includes:
   a cover rolling portion configured to wind or unwind the door cover; and
   an elastic operating portion connected to the cover rolling portion and configured to guide winding or unwinding of the door cover.

5. The energy storage system according to claim 2, wherein the cover locking unit includes:
   a locking body mounted to a bottom portion of the door cover; and
   a locking lever provided at the locking body and detachably mounted to the rack housing.

6. The energy storage system according to claim 5,
   wherein a level insert groove is provided at the rack housing so that the locking lever is inserted thereto.

7. The energy storage system according to claim 2,
   wherein the door cover is made of polyvinyl material.

8. The energy storage system according to claim 1,
   wherein the at least one battery pack includes at least one battery cell, and
   wherein the at least one battery cell is a secondary battery.

9. An energy storage system, comprising:
   at least one battery rack including at least one battery pack;
   a rack housing having an accommodation space for accommodating the at least one battery rack; and
   a rack door unit mounted to the rack housing to open or close the accommodation space of the rack housing and at least partially made of flexible material,
   wherein the rack door unit includes a door cover configured to be at least partially rolled to cover a front portion of the accommodation space.

10. The energy storage system according to claim 9, wherein the rack door unit includes:
    a rack door body mounted to the rack housing, wherein the door cover is connected to the rack door body and configured to cover a front portion of the accommodation space; and
    a cover locking unit mounted to the door cover and configured to separate or fix the door cover from/to the rack housing so that the accommodation space is opened or closed.

11. The energy storage system according to claim 10,
    wherein the door cover is at least partially rolled toward the rack door body when being separated from the rack housing.

12. The energy storage system according to claim 11, wherein the rack door body includes:
    a cover rolling portion configured to wind or unwind the door cover; and
    an elastic operating portion connected to the cover rolling portion and configured to guide winding or unwinding of the door cover.

13. The energy storage system according to claim 10, wherein the cover locking unit includes:
    a locking body mounted to a bottom portion of the door cover; and
    a locking lever provided at the locking body and detachably mounted to the rack housing.

14. The energy storage system according to claim 13,
    wherein a level insert groove is provided at the rack housing so that the locking lever is inserted thereto.

15. The energy storage system according to claim 9,
    wherein the door cover is made of polyvinyl material.

16. The energy storage system according to claim 9,
    wherein the at least one battery pack includes at least one battery cell, and
    wherein the at least one battery cell is a secondary battery.

* * * * *